(No Model.)

E. F. BURCH.
FILTER.

No. 506,666. Patented Oct. 17, 1893.

Witnesses:
Wm E. Sulter
M. E. Cowell

Inventor:-
Eli F. Burch
by his attorney
H. D. Billson

UNITED STATES PATENT OFFICE.

ELI F. BURCH, OF BALTIMORE, MARYLAND.

FILTER.

SPECIFICATION forming part of Letters Patent No. 506,666, dated October 17, 1893.

Application filed March 6, 1893. Serial No. 464,819. (No model.)

*To all whom it may concern:*

Be it known that I, ELI F. BURCH, a citizen of the United States, residing at Baltimore, in the State of Maryland, have invented certain new and useful Improvements in Filters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to filters, and it relates more particularly to that class of filters designed particularly for filtering oil, and among the objects in view, is to provide an extremely simple, inexpensive and efficient filter which is adapted to filter oil in a thorough manner; also to provide such a filter in which the filtering media may be readily removed from the apparatus for the purpose of cleaning and substituting fresh filtering material.

The invention consists in the peculiar construction, arrangement and combination of parts, as hereinafter fully described, illustrated in the accompanying drawings and pointed out in the appended claims.

Figure 2:
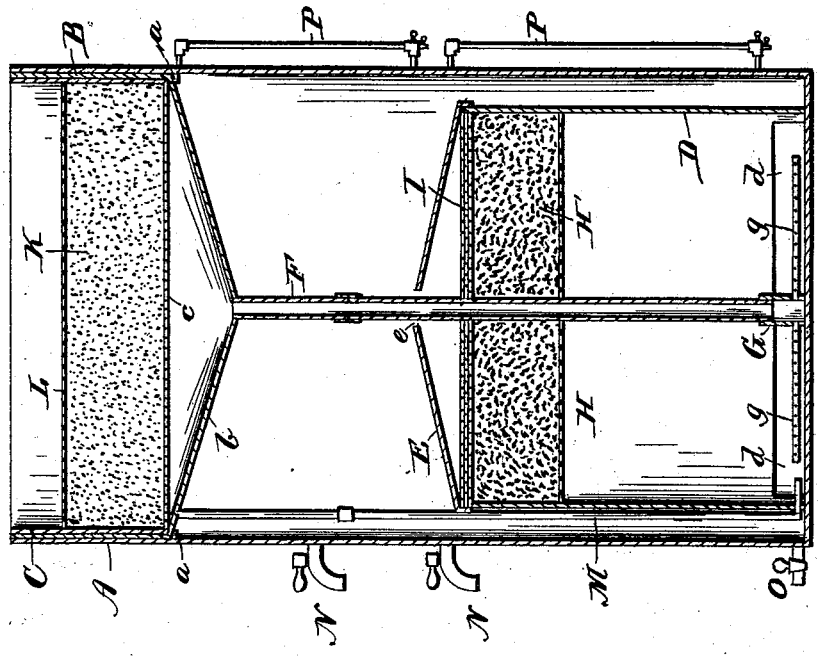
Figure 1:
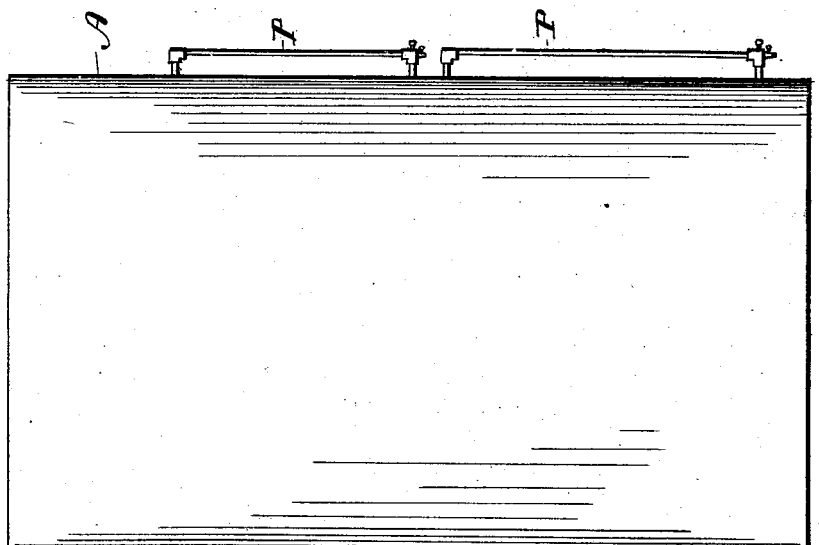

In the drawings:—Figure 1 is an elevation of my improved filter, and Fig. 2 is a vertical section thereof.

A indicates an outer sheet metal or other casing or tank preferably cylindrical in form and of any desired capacity. Within the upper portion of said tank is arranged a cylindrical vessel B, which is provided with a conical bottom $b$, as shown said vessel resting upon a shoulder or lugs $a$, provided upon the interior of the tank A, and within the vessel B is arranged a vessel C having a wire or perforated bottom $c$.

Within the lower portion of the tank is arranged a cylindrical vessel D the diameter of which is less than the interior of the tank, so as to leave an annular space between the two. Upon the upper end of the vessel D is fitted a hood or cover E having a central opening $e$.

F indicates a pipe the upper end of which is fitted within the conical bottom $b$, of vessel B and passing downwardly through the opening $e$, into the vessel D and in proximity to the bottom of the tank and at that point it is provided with a rose head or spraying device G, which is provided with the horizontal radial arms $g$, perforated as shown, or said arms may be tapped directly into the pipe F if desired. The number of these arms may, of course, be varied, as desired.

The vessel D may be supported upon suitable legs so as to provide spaces $d$ between the lower edge of said vessel and the bottom of the tank, or the vessel itself may be cut away at its lower end to provide such spaces.

Within the vessel D toward its upper end is fitted a filtering or screen plate H upon which is placed any suitable filtering material H' preferably cork shavings, and above said material is placed layers of felt or similar material I.

Upon the perforated bottom $c$, of vessel C is placed suitable filtering material K such as sand or the like, and above the same is arranged a filtering or screen plate L.

M indicates a pipe which passes downwardly within the tank exteriorly of vessel D and having its lower end communicating with the interior of said vessel.

N indicates suitable draw-off cocks for the filtered oil and water.

O is a sediment cock or valve for drawing off the sediment from the oil or water, and P are suitable gage glasses provided in the tank A for determining the level of the oil and water in said tank.

If desired the pipes F and M may be made in sections detachably connected together by suitable sleeves or the like as shown.

When it is desired to gain access to the interior of the tank for the purpose of cleaning the filtering plates and substituting fresh filtering material, the vessels, B and C, with the plate L and filtering material K are raised out of the tank and with the vessel B, the upper section of the pipes F and M and if it be desired to also remove the vessel D with its filtering plates and material this may then be readily done.

The operation of my improved filter may be briefly described as follows: Water is first poured into the tank at the upper end thereof above the plate L and said water then passes through the latter and the filtering material K and perforated bottom c whence it flows down through the pipe F and issues through the perforated arms g, into the vessel A at the spaces d, and out through the said spaces into the space surrounding the vessel D until the said water fills or partially fills said vessel D and the surrounding space. (Or if it be desired the vessel C with its plate and filtering material may be removed and the water introduced directly into the pipe F or M.) The oil to be filtered is then poured into the tank and passes through the plate L, filtering material K and bottom c, and pipe F whence it flows through the perforated arms g, and upward through the water in vessel D and then through the plate H and filtering material H' I, thus becoming thoroughly filtered and then through the opening e, whence it flows into the space surrounding the vessel D and above the water contained in said space and may then be drawn off through either of the cocks N. In passing through the sand the oil may carry away with it some particles of sand, which particles will, however, be removed from the oil when passing through the water in vessel D, and any sediment that may be contained in the oil that is not filtered therefrom will settle upon the hood E or through the water in the space around vessel D onto the bottom of tank A, whence it may be drawn off through cock or valve O. Should the perforations in arms g, become clogged then the water or the oil as the case may be will rise upon the bottom c, and flow down through the pipe M.

What I claim, and desire to secure by Letters Patent, is—

1. In a filter, the combination with a suitable tank, of a vessel B arranged within the upper portion thereof and having a conical bottom, a vessel C arranged in the vessel B and provided with a perforated bottom, filtering material arranged upon said bottom, a filtering plate above said material, a vessel D arranged within the lower portion of the tank and having a less diameter than the interior of the same whereby an annular space is formed between said tank and vessel, a pipe leading at its upper end into the conical bottom of vessel B and provided at its lower end with a spraying device, a filtering plate arranged in the upper portion of vessel D, filtering material above said plate, a conical cover for the vessel D arranged above said filtering material and provided at its center with an aperture through which passes the pipe connecting vessels B and D, said aperture being sufficiently large to leave an opening around the pipe, and draw-off cocks in the tank, for the purpose specified.

2. In a filter, the combination with a suitable tank, of a vessel B arranged within the upper portion thereof and provided with a conical bottom, a vessel C arranged within the vessel B and provided with a perforated bottom, filtering material arranged upon said bottom, a filtering plate above said material, a vessel D arranged within the lower portion of the tank and having a less diameter than the interior of the same, a pipe communicating with the vessels B, and D, perforated arms carried by said pipe near its lower end, a filtering plate arranged in the vessel D, filtering material arranged above said plate, a cover for the vessel D and provided with an aperture, draw-off cocks in the tank, and a pipe M discharging into the vessel D, and a sediment cock or valve in the tank, for the purpose specified.

In testimony whereof I affix my signature in presence of two witnesses.

ELI F. BURCH.

Witnesses:
ALBERT WILLSON,
C. A. MICHENER.